United States Patent [19]

Potiker

[11] Patent Number: 4,788,537

[45] Date of Patent: Nov. 29, 1988

[54] MOUSE INTERFACE ASSEMBLY

[76] Inventor: Lowell A. Potiker, 26100 Hawthorne, Franklin, Mich. 48025

[21] Appl. No.: 97,872

[22] Filed: Sep. 17, 1987

[51] Int. Cl.$^4$ .............................................. G09G 3/02
[52] U.S. Cl. ................................ 340/710; 273/148 B; 434/45; 340/706
[58] Field of Search ....................... 340/706, 709, 710; 273/148 B; 74/471 R, 471 XY; 434/32, 45; 178/18

[56] References Cited

U.S. PATENT DOCUMENTS 4,659,313  4/1987  Kuster et al. .......................... 434/45

Primary Examiner—Gerald L. Brigance
Assistant Examiner—Richard Hjerpe
Attorney, Agent, or Firm—Brooks & Kushman

[57] ABSTRACT

An assembly (10) for interfacing with a mouse (12) including a transducer (13) which controls movement of a cursor on a computer display is disclosed as including a base (14), a first member (16) having a peripheral surface (18) for interfacing with the mouse (12) mounted on the base (14) for rotary and axial movement and a second member (20) connected to the first member (16) and manually actuable for actuating driving movement of the first member (16) to thereby allow an operator to simulate control wheel movement associated with playing video games.

15 Claims, 1 Drawing Sheet

MOUSE INTERFACE ASSEMBLY

TECHNICAL FIELD

This invention relates to an assembly for interfacing with a mouse including a transducer which controls movement of a cursor on a computer display which has a particular utility for use with video games played on personal computers.

BACKGROUND ART

The enjoyment of video games has been enhanced by the adaptation of the games for use on a personal computer. The personal computer has increased access to video games and has brought video games to households and offices. These games are computer software packages that typically include manually actuable vehicles displayed on the computer screen, such as airplanes and cars, and that are playable by an operator that interfaces with the computer by operating a computer keyboard, a joystick, or a mouse that activates a cursor on the screen on the personal computer.

These conventional computer interface devices allow the operator to play the games with a usually inconsistent or awkward physical action required to achieve movement of the cursor on the video screen to actuate the vehicles. For example: the computer keyboard is similar to a typewriter and has keys that when struck activate the cursor; the joystick is similar to an automobile manual transmission shift selector that when moved controls the cursor; and the mouse, a hand held moveable device having a track ball connected to a transducer, when moved along a surface rotates the track ball and thereby controls movement of the cursor. Another type of mouse includes a transducer that is optically sensitive and when moved over a grid controls movement of the cursor. None of these interfacing devices simulate the actual physical control movements an operator would experience if an actual device such as an airplane or an automobile.

DISCLOSURE OF INVENTION

An object of the present invention is to provide an assembly for interfacing with a mouse that includes a transducer which controls movement of a cursor on a computer display that has particular utility in connection with video games played on a personal computer. The assembly simulates for an operator control wheel movements which the operator would experience if the operator was actually operating a device featured in the game. This includes flying a plane or driving a car, even though the operator is playing the video game. The assembly is economical to manufacture and provides the mouse with a seemingly large area of movement while requiring a rather small space.

In carrying out the above object, the assembly comprises a base, a first member and a second member. The first member has a peripheral surface and is mounted on the base for rotary and axial movement. The base also mounts the mouse thereon with the transducer interfacing with the peripheral surface of the first member. The second member is connected to the first member and is manually actuable by an operator for actuating driving movement of the first member.

In the preferred embodiment of the invention, the first member is a cylindrical member having a longitudinal axis. The cylindrical member is preferably elongated. In one embodiment the elongated cylindrical member is in operational contact with the transducer for operation of a mechanically actuated mouse. In another embodiment the elongated cylindrical member has a grid about the peripheral surface that is optically readable by the mouse if the mouse is of the optically actuated type.

In the preferred construction, the base envelopes the first member and includes an aperture therein for receiving the mouse and stationarily mounting the mouse. A retaining band secures the mouse therein the aperture.

Also in the preferred construction, an axle having opposed ends fixedly mounts the first member on the axles such that the axle extends outwardly from the cylindrical member and beyond the base. The axle thereby mounts the cylindrical member on the base. A control wheel is mounted on one end of the axle for manual actuation of the first member. Supports mount the axle on the base. Most preferably the supports are bearings mounted on the base.

The objects, features, and advantages of the present invention are readily apparent from the following detailed description of the best mode for carrying out the invention when taken with the accompanying drawings.

BEST MODE FOR CARRYING OUT THE INVENTION

Figure 1:
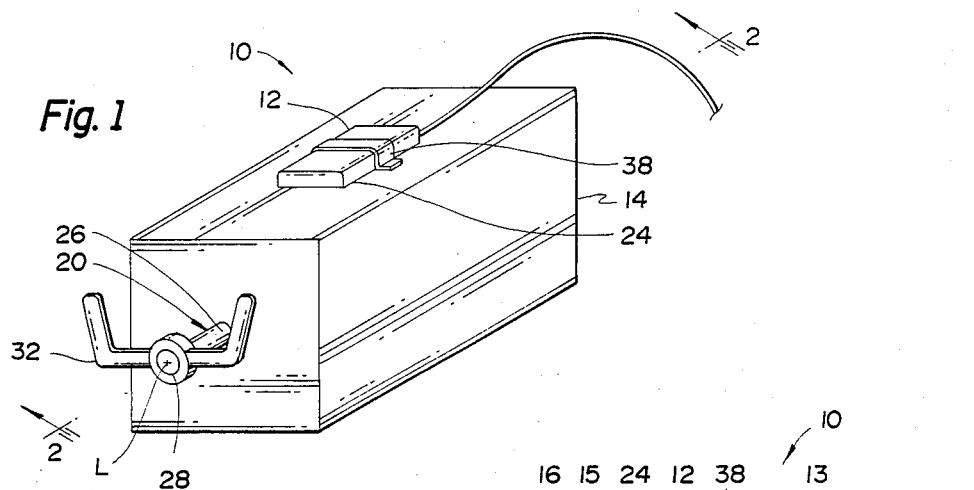
FIG. 1 is a perspective view of the assembly for interfacing with a mouse constructed in accordance with the present invention.

Referring to FIG. 1 of the drawings, an assembly for interfacing with a mouse including a transducer which controls movement of a cursor on a computer display constructed in accordance with the present invention is generally indicated by reference numeral 10 and is used for playing video games on personal computers. As is hereinafter more fully described, the assembly 10 provides an operator with simulated control wheel movement such as that used in flying a plane or driving an automobile while playing the video game. The assembly 10 is economical to manufacture and provides the mouse 12 with a seemingly large area of movement while actually requiring a rather small space.

Figure 2:
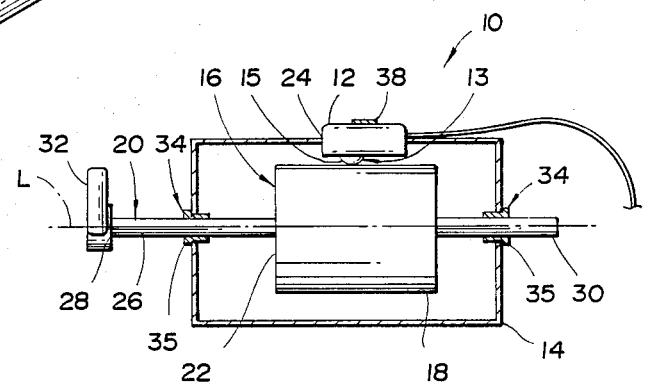
FIG. 2 is a sectional view taken along the lines 2—2 in FIG. 1 showing a mechanically actuated mouse having a track ball mounted on the assembly with the track ball in operational contact with a peripheral surface of a cylindrical member.

As shown in FIGS. 1 and 2 the assembly 10 comprises a base 14 on which the mouse 12 is mounted. Mouse 12 is shown in FIGS. 1 and 2 as a mechanically actuated mouse having a trac ball 15. Another type of mouse 12 is an optically actuated mouse that optically sences changing surface conditions such as movement over a gridded surface. A first member 16 having a peripheral surface 18 is mounted on the base 14 for rotary and axial movement. Base 14 also mounts the mouse 12 thereon with a transducer 13 shown here as a trac ball 15 in operational contact with the peripheral surface 18. A second member 20 is connected to the first member 16 and is manually actuable for actuating driving movement of the first member.

As shown in FIG. 2 the first member 16 is a cylindrical member 22 having a longitudinal axis L about which the rotary and axial movement occurs. The cylindrical member 22 is elongated. Base 14 envelopes the cylindrical member 22 and includes an aperture 24 therein for receiving the mouse 12 and stationarily mounting the mouse 12.

With further reference to FIG. 2 an axle 26 having opposed ends 28 and 30 fixedly mounts the cylindrical member 22 on the base 14. Axle 26 defines longitudinal axis L and extends outwardly from the cylindrical member 22 and beyond the base 14.

With further reference to FIG. 1 a control wheel 32 is mounted on one end 28 of the axle 26 for manual actuation by an operator of the cylindrical member 22 to thereby actuate mouse 12. Supports 34 are shown in FIG. 2 for mounting the axle 26 on the base 14. Preferably, supports 34 are bearings 35 mounted on the base 14.

Figure 3:
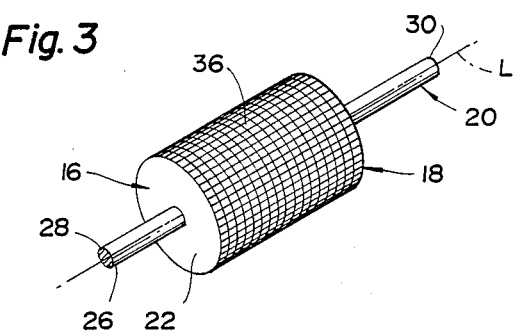
FIG. 3 is a plan view of the cylindrical member having a grid therein the peripheral surface for us with an optically actuated mouse.

FIG. 3 illustrates the cylindrical member 22 having a grid 36 about its peripheral surface 18 that is optically readable by an optically actuated mouse 12. It is contemplated that this gridded cylindrical member 22 is to be used with an optically actuated mouse 12 and that the gridded cylindrical member can be used with the same other components of the assembly 10 that are used with a manually actuated mouse.

Figure 4:
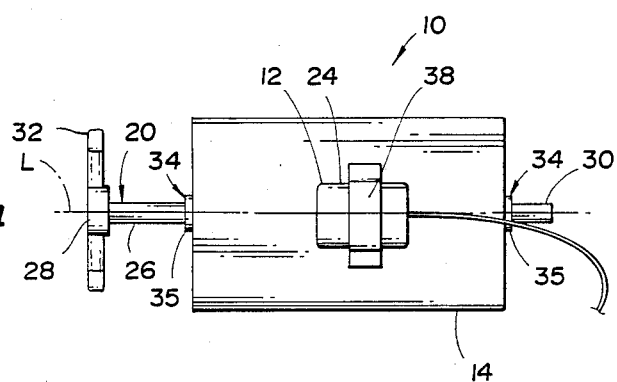
FIG. 4 is a plan view of the mouse mounted in an aperture in the assembly and retained therein by a retaining band.

FIG. 4 illustrates the base 14 having a retaining band 38 of a suitable material for securing the mouse 12 therein the aperture 24. It is contemplated that VELCRO or elastic be suitable for such a retaining band 38.

Assembly 10 is used when playing video games that typically include operating a vehicle such as an airplane or car on a video screen on a personal computer. Movement of these vehicles are activated by mouse 12. Mouse 12 must be moved over a relatively large surface area in order to activate the transducer 13 which controls movement of the cursor on the computer display. The mouse 12 is placed into the aperture 24 of the base 14 and secured therein by retaining bands 38. With the computer screen on and the game under way the operator actuates control wheel 32 of the assembly 10 by applying rotary and axial movement to actuate the cylindrical member 22 therein the assembly 10. The rotary and axial movement of control wheel 32 is designed to simulate the actual control movements required of the operator of an airplane if the video game is designed to include flying a plane on the video screen. The rotary movement of the control wheel 32 can simulate the steering wheel movements of the driver of a car if the video game is centered about driving a car.

While the best mode for carrying out the invention has been described in detail, those familiar with the art which this invention relates or recognized various alternative designs and embodiments for practicing the invention as defined by the following claims.

What is claimed is:

1. An assembly (10) for interfacing with a mouse (12) including a transducer (13) which controls movement of a cursor on a computer display, the assembly comprising:
   a base (14);
   a first member (16) having a peripheral surface (18) mounted on the base (14) for rotary and axial movement thereon; said base (14) also adapted to receive and retain said mouse (12) thereon with the transducer (13) interfacing with the peripheral surface (18); and
   a second member (20) connected to the first member (16) and manually actuable for actuating driving movement of the first member (16).

2. An assembly (10) as in claim 1 wherein said first member (16) is a cylindrical member (22) having a longitudinal axis (L).

3. An assembly (1) as in claim 2 wherein said cylindrical member (22) is elongated.

4. An assembly (10) as in claim (3) wherein said peripheral surface (18) of the elongated cylindrical member (22) is in operational contact with the transducer (13) for mechanical operation of the mouse (12).

5. An assembly (10) as in claim 3 wherein said elongated cylindrical member (22) has a grid (36) about its peripheral surface (18) optically readable by the mouse (12).

6. An assembly (10) as in claim 2 further including an axle (26) having opposed ends (28, 30) for fixedly mounting said first member (16) thereon.

7. An assembly (10) as in claim 6 wherein said axle (26) extends outwardly from the cylindrical member (22) and beyond the base (14) and mounts the cylindrical member (22) thereon the base (14).

8. An assembly (10) as in claim 7 further including a control wheel (32) mounted on one end of the axle (26) for manual actuation of the first member.

9. An assembly (10) as in claim 7 further including supports (34) for mounting the axle (26) on the base (14).

10. An assembly (10) as in claim 9 wherein said supports (34) are bearings (35) mounted thereon the base (14).

11. An assembly (10) as in claim 1 wherein said base (14) envelopes the first member (16).

12. An assembly (10) as in claim 11 wherein said base (14) includes an aperture (24) therein for receiving the mouse (12) and stationarily mounting the mouse (12).

13. An assembly (10) as in claim 12 further including a retaining band (38) for securing the mouse (12) therein the aperture (24).

14. An assembly (10) for interfacing with a mouse (12) including a transducer (13) which controls movement of a cursor on a computer display, the assembly (10) comprising:
   a base (14) having an aperture (24) therein for stationarily mounting the mouse (12);
   an elongated cylindrical member (22) having a peripheral surface (18) mounted on the base (14) for rotary and axial movement thereon; said base (14) also for mounting said mouse (12) thereon with the transducer (13) in operational contact with the peripheral surface;
   an axle (26) having opposed ends for fixedly mounting the cylindrical member (22) thereon; said axle (26) extending outwardly from the cylindrical member (22) and beyond the base (14); and
   a control wheel (32) mounted on one end (28) of the axle (26) for manual actuation of the cylindrical member (22) to thereby activate said mouse (12) and also to simulate control wheel movement.

15. An assembly (10) for interfacing with a mouse (12) including a transducer (13) which controls movement of a cursor on a computer display, the assembly (10) comprising:
   a base (14) having an aperture (24) therein for stationarily mounting the mouse (12);

an elongated cylindrical member (22) having a peripheral surface (18) mounted on the base (14) for rotary and axial movement thereon; said cylindrical member (22) having a grid about its peripheral surface (18) optically readable by the mouse (12);

an axle (26) having opposed ends for fixedly mounting the cylindrical member (22) thereon; said axle (26) extending outwardly from the cylindrical member (22) and beyond the base (14); and a control wheel (32) mounted on one end (28) of the axle (26) for manual actuation of the cylindrical member (22) to thereby activate said mouse (12) and also to simulate control wheel movement.

* * * * *